March 14, 1950 — L. L. SALFISBERG — 2,500,874
PACKAGE CRIMPING MACHINE
Filed April 23, 1945 — 3 Sheets-Sheet 1
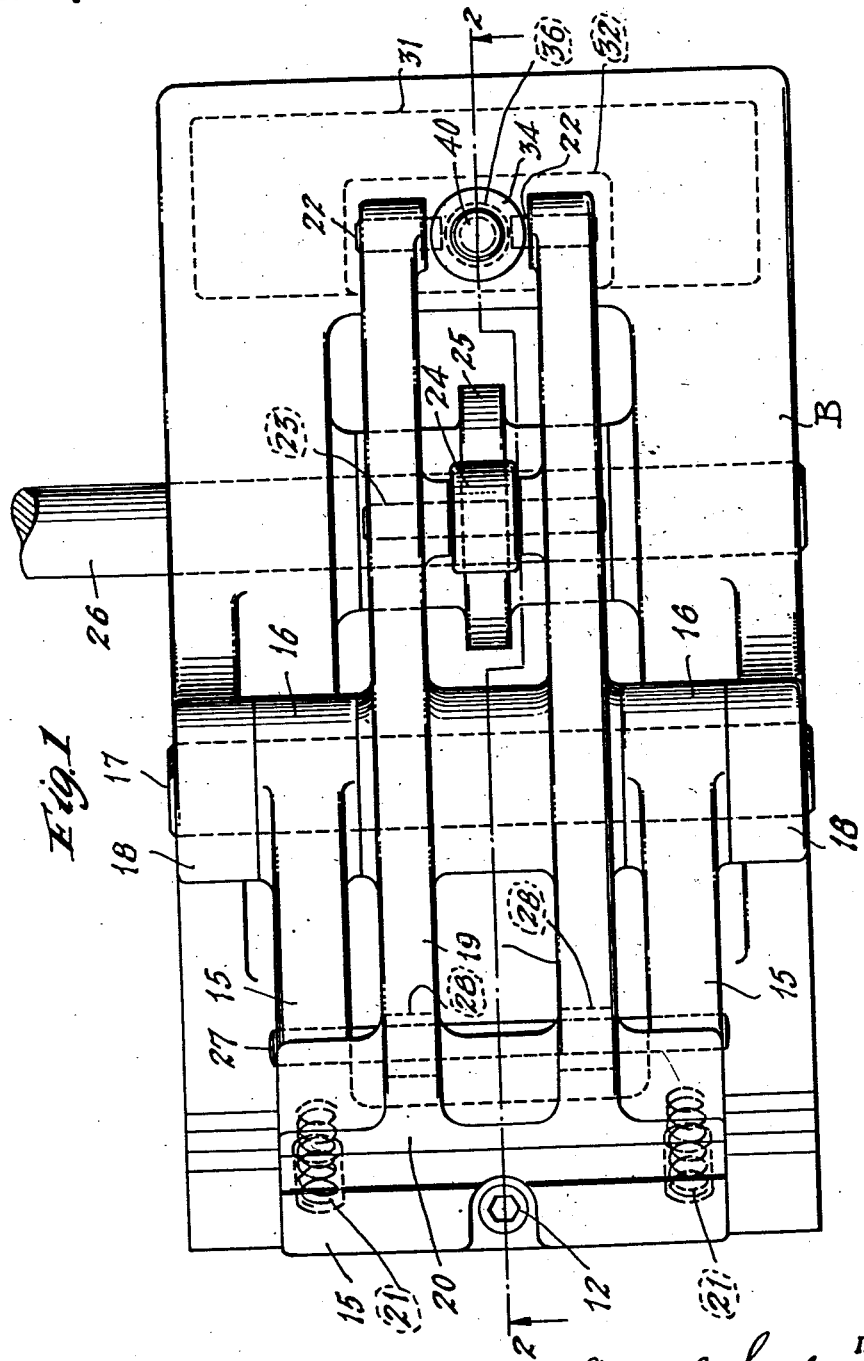

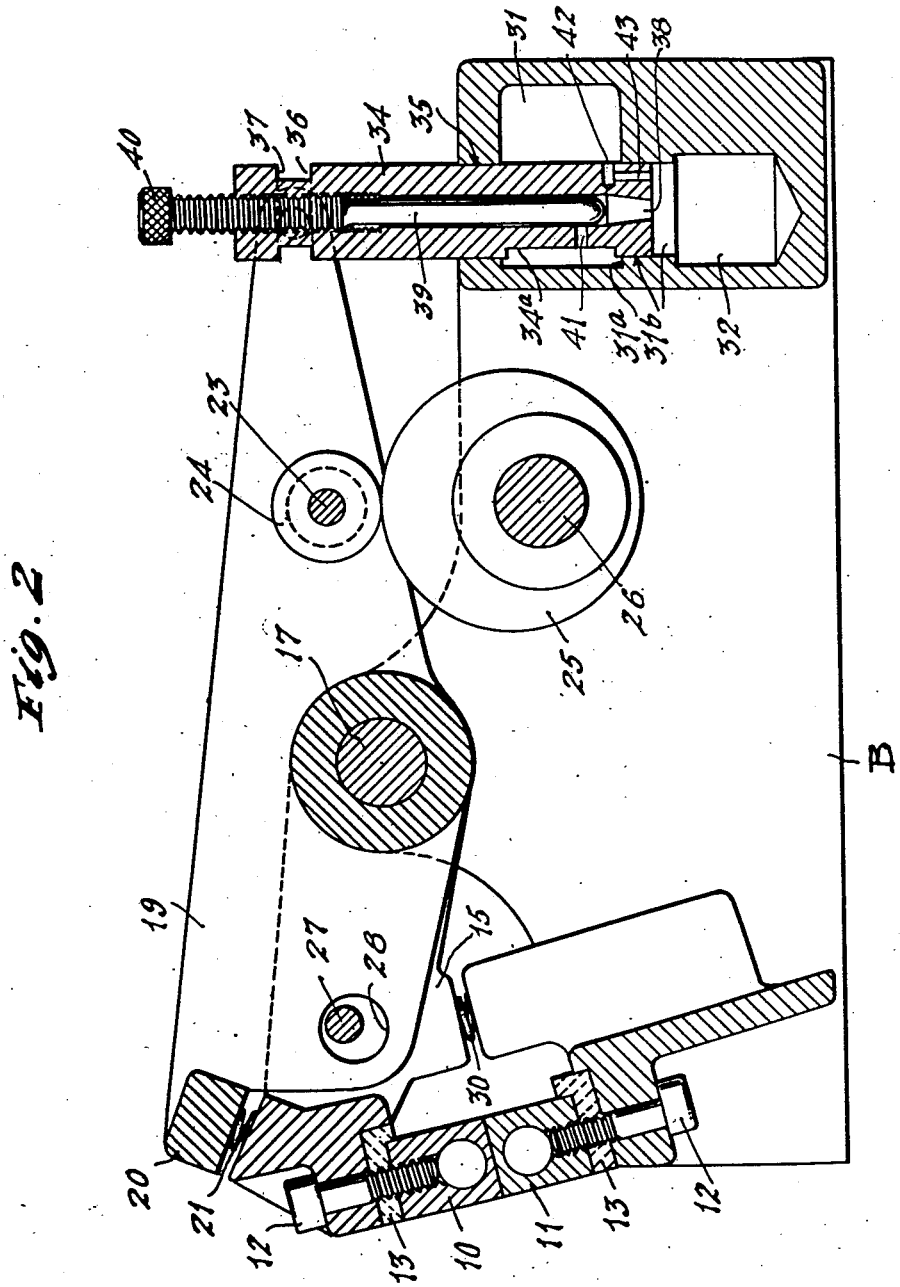

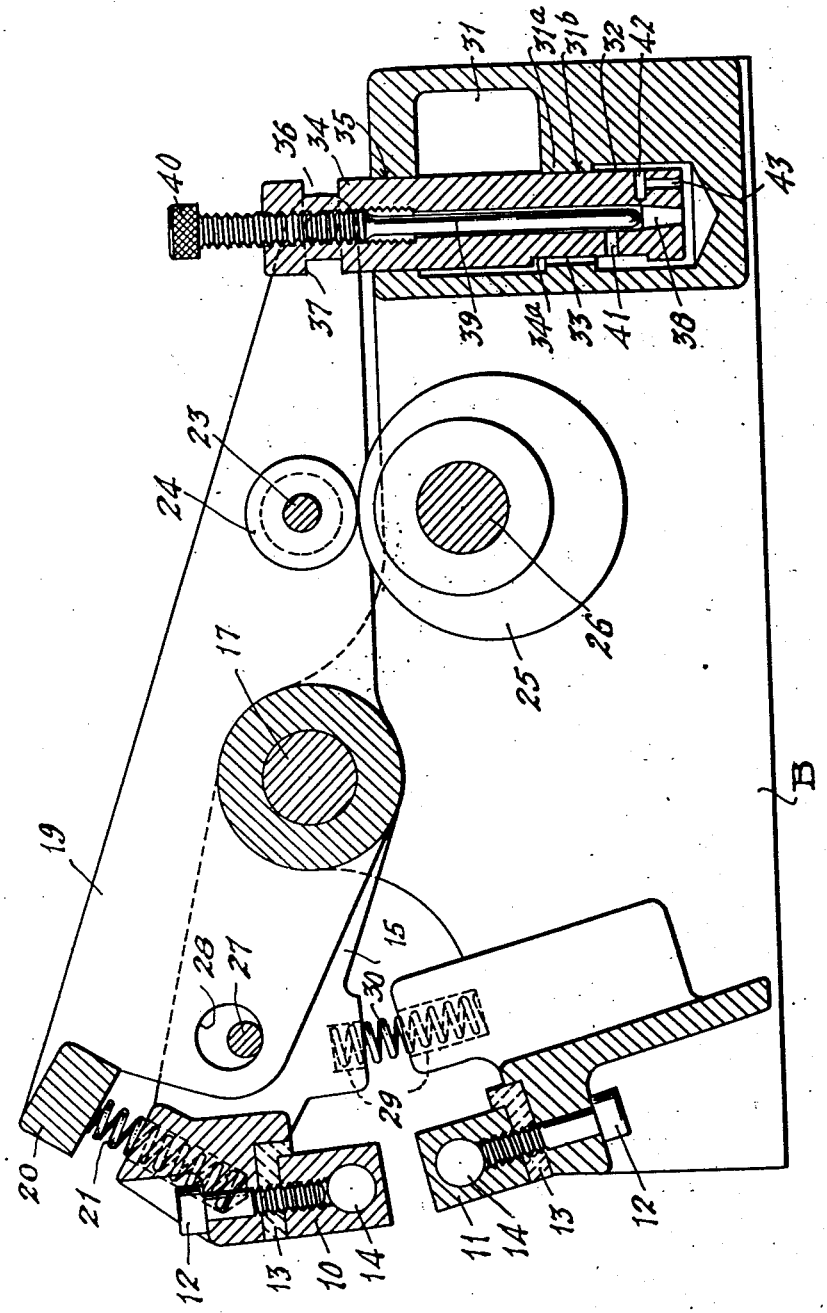

Patented Mar. 14, 1950

2,500,874

UNITED STATES PATENT OFFICE 2,500,874

PACKAGE CRIMPING MACHINE

Leroy L. Salfisberg, South Orange, N. J., assignor to Seal-Craft, Incorporated, Newark, N. J., a corporation of New Jersey Application April 23, 1945, Serial No. 589,721

6 Claims. (Cl. 154—42)

The present invention relates to the crimping and/or sealing of cellulosic packages and wrappers and more especially to a machine for effecting the crimping and/or sealing of packages containing tablets of aspirin, vitamins or other compositions of nutritive or medicinal nature.

Machines of the same general type of the present invention are already known, one such machine being described in U. S. Patent No. 2,140,117, granted December 13, 1938. Such a machine has been found to be satisfactory in the main but capable of simplification and improvement particularly in connection with the crimping jaw operating and timing mechanism employed for controlling the duration and speed of the crimping and/or sealing operations.

Objects of the present invention are, accordingly, to simplify and improve upon existing crimping mechanism for controlling the duration and rapidity of the crimping and/or sealing operations and such other and further objects and advantages as will be apparent or pointed out hereinafter.

In the accompanying drawings:

Figure 1 is a plan view of the essentials of a package crimping machine constructed in accordance with the present invention;

Figure 2 is a longitudinal sectional view of the machine taken along line 2—2 of Figure 1 showing the crimping jaws in closed operative position; and Figure 3 is a view similar to Figure 2 but showing the crimping jaws in open inactive position.

Like numerals designate corresponding parts throughout the various views of the drawings.

Referring now to the drawings, the numeral 10 indicates the upper movable crimping jaw of the package crimping machine of the present invention and the numeral 11 indicates the lower stationary crimping jaw thereof. Each crimping jaw is secured by one or more screws 12 to an adjacent extending part of the machine, as shown. A heat resistant member 13 having low heat conductivity is provided between each jaw and the adjacent extension or framework. Members 13 may be composed of asbestos or any other suitable amphibolic material. The jaws 10 and 11 are provided in the usual manner with bores 14 for the reception for heating elements (not shown) which are electrically heated to the desired temperature in order to raise the temperature of the crimping jaws in those instances in which it is desired to heat-seal the package material simultaneously with crimping thereof. It is to be understood that the crimping faces of the crimping jaws may be provided with suitable projections such as serrations or corrugations or may be smooth or substantially smooth for pressure and/or heat sealing. It is further to be understood that suitable shearing knives or the like (not shown) may be provided for package material severing or cutting purposes when the crimping jaws approach each other. These and other details will be appreciated by a reference to Patent No. 2,140,117 referred to above, the pertinent parts of which are hereby made a part hereof.

The extending machine part to which upper crimping jaw 10 is secured is a portion of a U-shaped (in plan) lever 15, the parallel arms of which terminate in "eyes" 16 disposed on shaft 17 which is mounted in bearings 18 on the machine framework. Between the arms of the lever 15 are the parallel arms of an intermediate long lever 19, the forward ends of which merge into and form a cross-head 20. Strong coil springs 21 extend between head 20 and sockets provided in the extending machine part to which the upper crimping jaw is secured. The intermediate lever arms are fulcrumed on shaft 17 and extend rearwardly thereof, terminating in ends of reduced size through which project the operating pins 22, as shown in Figure 1. Between shaft 17 and pins 22 is a pin 23 extending between the intermediate lever arms and on which is rotatably mounted a follower roller 24 which is adapted to follow the profile of cam 25 eccentrically fixed on power shaft 26 journaled in the machine framework and suitably rotated by any available prime mover or source of power (not shown).

A pin 27 is fixed in lever 15 and extends between the spaced parallel arms thereof forwardly of shaft 17. Openings 28 are provided in the spaced parallel arms of intermediate lever 19 of greater diameter than the diameter of pin 27, thus permitting a certain amount of relative movement between levers 15 and 19, which movement is limited by the abutment of pin 27 against the bottom of openings 28 as in the position of the parts illustrated in Figure 3. The under portion of lever 15 and the upper portion of the base B of the machine are socketed as indicated at 29 for the reception of one or more coil springs 30.

The rearward portion of the crimping machine is provided with a hydraulic timing and control mechanism. For this purpose the base B is compartmented to provide an upper chamber 31 and a lower smaller chamber 32 separated by a horizontal wall 31a having an opening 31b. A piston 34 is adapted to reciprocate in said opening 31b and has a cutaway portion 34a that normally forms a passage 33 between the piston and the walls of opening 31b. This piston 34 is reciprocable between the positions shown in Figures 2 and 3 as lever 19 is rocked about shaft 17 under the influence of cam 25 and coil spring 2. Piston 34 extends through chambers 31 and 32 and projects up beyond the top of the base B through an opening 35 in which it fits snugly in liquid-tight fashion. Near its upper end the piston is provided with an annular groove 36 into which pins 22 project, thus causing piston 34 to rise by upward pressure of such pins against the annular shoulder 37 as cam 25 passes from the position illustrated in Figure 3 to that of Figure 2. Coil springs 30 cause gradual return of the parts to the condition shown in Figure 3 ready for another cycle of operations.

Piston 34 has a passageway 38 therethrough, the upper portion of which is interiorly threaded for coaction with the exteriorly threaded upper portion of needle valve 39 the position of which in passageway 38 can be adjusted by means of the knurled enlargement 40 on the upper end thereof. Horizontal passageway 41 extends from passageway 38, with which it communicates, to the exterior of the piston and communicates with chamber 31 or 32 depending upon the position of the piston as will be appreciated from Figures 2 and 3. Piston 34 is also provided with a vent made up of horizontal passage 42 and vertical passage 43 of small bore to provide communications between chambers 31 and 32 to break the vacuum in chamber 32 caused by the rise of the piston from its lowermost position to its uppermost position, thus preventing interference with the effective functioning of the piston.

The operation of the machine will be understood and appreciated from the foregoing. As shaft 26 is rotated the cam 25 forces roller 24 upwardly during each rotation. This rocks lever 19 about fulcrum 17 to lower the forward portion of lever 19 and through springs 21 swing lever 15 downwardly until jaw 10 strikes jaw 11 or packaging material interposed between the jaws, against the influence of coil springs 30. As the rearward portion of lever 19 rises, the pins 22 act to raise piston 34. The liquid in chamber 31 flows freely into chamber 32 via passage 33 and passages 41 and 38. The free liquid flow permits a rapid closing action of jaws 10 and 11. As the cam 25 reaches its "highest position" the jaws are completely closed and the lower end of the piston closes the opening 31b. The vent 42, 43 breaks the partial vacuum created in the chamber 32 during ascent of the piston, by allowing liquid to flow from chamber 31 to chamber 32.

The movement of the lever 19 in said direction after the initial closing of the jaws compresses springs 21 and moves the piston 34 through that portion of its stroke during return movement through which the piston resists or retards opening of the jaws as hereinafter described. When lever 19 is released by the cam as the latter moves toward its lower position, the coil springs urge the forward ends of the lever arms upwardly to open the clamping jaws and piston 34 starts its downward or return movement. Release of the crimping jaws is, however, at first retarded because the liquid in lower chamber 32 can flow only slowly through the needle valve passage into the upper chamber 31. After the lower end of the piston moves below opening 31b a relatively free flow of liquid is again possible through passage 33 and hence the remainder of the jaw opening operation is rapid. The precise position of valve 39 in piston passageway 38 controls the "period" of the piston and thus constitutes a timing device for regulating the duration of the period of crimping or sealing contact of the jaws with the packaging material.

It will be understood by those skilled in the art that any suitable control mechanism may be utilized for starting and stopping the cam.

The foregoing is presented as illustrative and not as limitative and it is to be understood that various additions, omissions, substitutions and modifications can be made within the spirit and scope of the invention.

I claim:

1. In a machine of the character described, a base member having therein upper and lower spaced liquid-containing chambers connected by a communicating passageway, a piston for connection to mechanism to be controlled and reciprocable in said passageway and extending into both said chambers, a longitudinal bore in said piston and a lateral port leading outwardly from said bore, said piston closing said passageway when the piston is in its upper position and there being a second passage to establish free communication between said chambers as the piston reaches a certain point in its downward movement, and a needle valve for controlling flow of liquid through said bore and said port, whereby said piston may freely move in one direction but is retarded for a predetermined time in its movement in the opposite direction.

2. The machine as defined in claim 1, wherein said second passage maintains communication between said chambers during the major portion of the upward movement of said piston to permit rapid flow of liquid from the upper to the lower chamber and consequent quick movement of said piston.

3. The machine as defined in claim 1, wherein said second passage is formed between said piston and the wall of said passageway by a groove in the outer surface of said piston.

4. The machine as defined in claim 1, wherein said second passage maintains communication between said chambers during the major portion of the upward movement of said piston to permit rapid flow of liquid from the upper to the lower chamber and consequent quick movement of said piston, and with the addition of a small port in said piston to establish communication between said chambers as said piston approaches its upper position to prevent formation of a vacuum in said lower chamber when said piston closes said passageway.

5. A crimping machine comprising a base, a fixed jaw mounted thereon, a first lever pivotally mounted on said base, a movable jaw mounted on said first lever, a second lever pivotally mounted intermediate its ends on a common axis with the pivot of the first lever, a yielding operative connection between said first lever and one end of said second lever such that said second lever may successively move relatively to said first lever and then cause actuation of said first lever in each of opposite directions to close said jaws upon movement in one direction and to open said jaws upon movement in the opposite direction, means for actuating said second lever to close said jaws and to permit opening thereof, upper and lower liquid-containing chambers on said base communicating with each other through a passageway, a piston reciprocable in said passageway and connected to the other end of said second lever for reciprocation into upper and lower positions when said jaws are closed and opened respectively, said piston partially closing said passageway but having a passage which communicates with the upper and lower chambers when said piston is in its upper position and said jaws are closed, a needle valve controlling said passage whereby upon movement of said piston as said second lever moves relatively to said first lever in opening of said jaws said movement of the lever is yieldingly resisted by flow of liquid through said passage in the piston from the lower to the upper chamber, there being a second passage to establish communication between said chambers at a predetermined point in said downward movement of the piston to reduce said resistance whereby said jaws are held closed for a predetermined time and are then quickly opened.

6. The crimping machine as defined in claim 5, wherein said second passage maintains communication between said chambers during the major portion of the upward movement of said piston and closing movement of said jaws to permit rapid flow of liquid from the upper to the lower chamber and consequent quick movement of said piston and closing of said jaws.

LEROY L. SALFISBERG.

REFERENCES CITED

The following references are of record in the file of this patent:

UNITED STATES PATENTS

| Number | Name | Date |
| --- | --- | --- |
| 535,484 | Carpenter | Mar. 12, 1895 |
| 1,219,035 | Pettengill | Mar. 13, 1917 |
| 1,318,749 | Haeberlein | Oct. 14, 1919 |
| 1,765,314 | Stuart | June 17, 1930 |
| 1,905,207 | Babitch et al. | Apr. 25, 1933 |
| 2,140,117 | Salfisberg | Dec. 13, 1938 |
| 2,402,298 | Salfisberg | June 18, 1946 |